United States Patent
Ford

(10) Patent No.: US 7,503,447 B2
(45) Date of Patent: Mar. 17, 2009

(54) TURNER/DIVIDER REJECT SYSTEM

(75) Inventor: Colin P. Ford, Woodstock, GA (US)

(73) Assignee: Graphic Packaging International, Inc., Marietta, GA (US)

( * ) Notice: Subject to any disclaimer, the term of this patent is extended or adjusted under 35 U.S.C. 154(b) by 326 days.

(21) Appl. No.: 11/457,854

(22) Filed: Jul. 17, 2006

(65) Prior Publication Data

US 2008/0011581 A1   Jan. 17, 2008

(51) Int. Cl.
*B65G 47/46* (2006.01)

(52) U.S. Cl. .......................... 198/370.03; 198/377.02; 198/890.1

(58) Field of Classification Search ............ 198/370.01, 198/367.1, 367.2, 370.03, 371.2, 890.1, 377.02
See application file for complete search history.

(56) References Cited

U.S. PATENT DOCUMENTS

| | | | |
|---|---|---|---|
| 3,580,379 A | | 5/1971 | Shuster |
| 3,677,389 A | * | 7/1972 | Benatar et al. ......... 198/377.02 |
| 3,940,907 A | | 3/1976 | Ganz |
| 4,100,715 A | | 7/1978 | Ganz |
| 4,389,832 A | | 6/1983 | Calvert |
| 4,508,206 A | * | 4/1985 | Moore et al. ............. 198/890.1 |
| 4,570,413 A | | 2/1986 | Roudat |
| 5,209,338 A | | 5/1993 | Kirtland |
| 5,212,930 A | | 5/1993 | Raudat |
| 5,237,801 A | | 8/1993 | Hillam et al. |
| 5,241,805 A | | 9/1993 | Johnson |
| 5,381,639 A | | 1/1995 | Calvert et al. |
| 5,558,489 A | | 9/1996 | Moncrief et al. |
| 5,626,002 A | | 5/1997 | Ford et al. |
| 5,630,311 A | | 5/1997 | Filix |
| 5,657,849 A | * | 8/1997 | Kirtland ..................... 198/411 |
| 5,671,587 A | | 9/1997 | Robinson |
| 5,784,857 A | | 7/1998 | Ford et al. |
| 5,826,408 A | | 10/1998 | Ford |
| 6,050,063 A | | 4/2000 | Ford et al. |
| 6,240,707 B1 | | 6/2001 | Ford et al. |
| 6,550,608 B1 | | 4/2003 | Brown et al. |
| 6,695,570 B2 | | 2/2004 | Ford et al. |
| 6,907,979 B2 | | 6/2005 | Ford et al. |
| 7,104,027 B2 | | 9/2006 | Ford et al. |

FOREIGN PATENT DOCUMENTS

| | | |
|---|---|---|
| DE | 3529657 | 2/1987 |
| DE | 102 03 459 | 7/2003 |
| EP | 0 686 583 A2 | 12/1995 |
| GB | 2 161 779 A | 1/1986 |
| WO | WO 99/14122 | 3/1999 |
| WO | PCT/US2007/011907 | 7/2006 |

* cited by examiner

*Primary Examiner*—James R Bidwell
(74) *Attorney, Agent, or Firm*—Womble Carlyle Sandridge & Rice, PLLC

(57) ABSTRACT

A turner/divider system for turning and separating or dividing a flow of product packages from a packaging machine that includes a turning section and a dividing section. A series of guide tracks extend along the turning section and guide a series of slats on which the product packages are being conveyed laterally across their path of travel so as to cause rotation or turning of the product packages. A reject system further monitors the incoming product packages moving along the turning section and causes rejected product packages to be diverted to a reject lane while non-rejected packages proceed along the turning section for turning. The turned product packages are then separated into a series of lanes as they are moved along the divider station.

20 Claims, 5 Drawing Sheets

TURNER/DIVIDER REJECT SYSTEM

FIELD OF THE INVENTION

The present invention generally relates to product packaging systems, and in particular to a product package reject system incorporated into a turning and dividing machine.

BACKGROUND OF THE INVENTION

In the packaging of various types of products such as bottles, cans, boxes, and other containers loaded into product cartons or packages for transfer and/or sale in bulk, the cans, bottles, or other articles or products are typically fed into a product packaging machine for loading into their cartons or packages. The products can be wrapped with the cartons, or can be loaded into a carton sleeve from the ends thereof, after which the ends of the cartons are closed and the enclosed cartons or product packages are discharged from the packaging machine.

Typically, after discharge, the product packages can be fed to a turning and dividing unit or station in which the product packages generally are rotated into a longitudinally extending alignment and thereafter divided into multiple product lanes for collection and packaging into cases for transportation or storage. A problem that exists, however, is that at times, defective or rejected packages, such as cartons where the ends are not properly folded, or cartons that are not properly filled with a full contingent of product, sometimes will not be detected or discovered until the product packages are turned and divided, and are ready to be loaded into cartons.

Automated vision detection systems have been used to ensure package quality and signal downstream reject systems to divert rejected product out of the product stream. Typical reject systems can, however, limit the speed at which the product packages are moved through the turner/divider unit or require more space in the line. For example, positioning the reject system after dividing generally requires that multiple reject systems be provided, one for each lane, thus substantially increasing the machine width and length. Alternatively, performing such a monitoring function after turning, but before dividing, would require increasing the width of the machine to allow turned packs to be rejected and would also require extra machine length for this function.

Accordingly, it can be seen that a need exists for a turner and divider unit and a system capable of monitoring and rejecting defective or rejected product packages without interfering with the turning and dividing functions and without substantially increasing the space required so as to address the foregoing and other related and unrelated problems in the art.

SUMMARY OF THE INVENTION

Briefly described, the present invention relates to a turner/divider system or unit for use in conjunction with a product packaging system or line. The turner/divider system of the present invention incorporates a reject system for monitoring and determining or detecting the presence of rejected product packages and thereafter diverting such rejected product packages to a reject lane prior to the packages being turned and separated or divided. The turner/divider system generally includes a turning section having a turning conveyor that receives a series of product packages in a first orientation from the product packaging machine, and a dividing section positioned downstream from the turning section and including a dividing conveyor having a series of diverging lanes along which the turned product packages are separated and transported for loading into cartons and/or storage.

The turning and dividing section conveyors each include a series of slats arranged in groups on which the product packages are received. The slats typically include guide pins mounted along a lower surface thereof, which guide pins are adapted to be received within and engage a series of longitudinally extending guide tracks. The guide pins can be formed with different lengths, and are matched with a guide track of a depth corresponding to the length of its associated guide pins. At least one to two of the slats of each group of slats moving along the turning section conveyor will include a turning pin mounted on an upper surface thereof. The products are received from the product-packaging machine along each group of slats. The products generally extend between the turning pins of the foremost and rearmost slats. As the groups of slats are moved along the turning section of the turner/divider system, the guide pins mounted to the lower surfaces of the foremost and rearmost slats of each group of slats are guided laterally outwardly along divergent paths by their guide tracks. As a result, the foremost and rearmost slats are pulled laterally across the path of travel of the product packages being conveyed along the turning section conveyor so as to cause the product packages to be rotated approximately 90° into a new orientation.

The turned product packages thereafter are transferred to the dividing conveyor of the turner/divider system. Each group of slats has guide pins mounted in different positions which engage a series of independent guide tracks so as to divide and direct the product packages along a series of spaced, separate product lanes.

In addition, a reject system is positioned along an upstream portion of the turning section and typically includes an inspection system having a sensor such as a camera or other, similar detector that is positioned to monitor and detect the presence of rejected packages as they begin moving along the turning section. Upon detection of a rejected product package, a switching mechanism is moved into a blocking position across the guide tracks. The groups of slats with the rejected product packages thereon are redirected along reject guide tracks to a reject lane extending adjacent the turning and dividing sections. The turning pins on the groups of slats with the rejected product packages are also redirected, preventing the rejected packages from being turned.

Various objects, features and advantages of the present invention will become apparent to those skilled in the art upon review of the following detailed description, when taken in conjunction with the accompanying drawings.

DETAILED DESCRIPTION OF THE INVENTION

Figure 1:
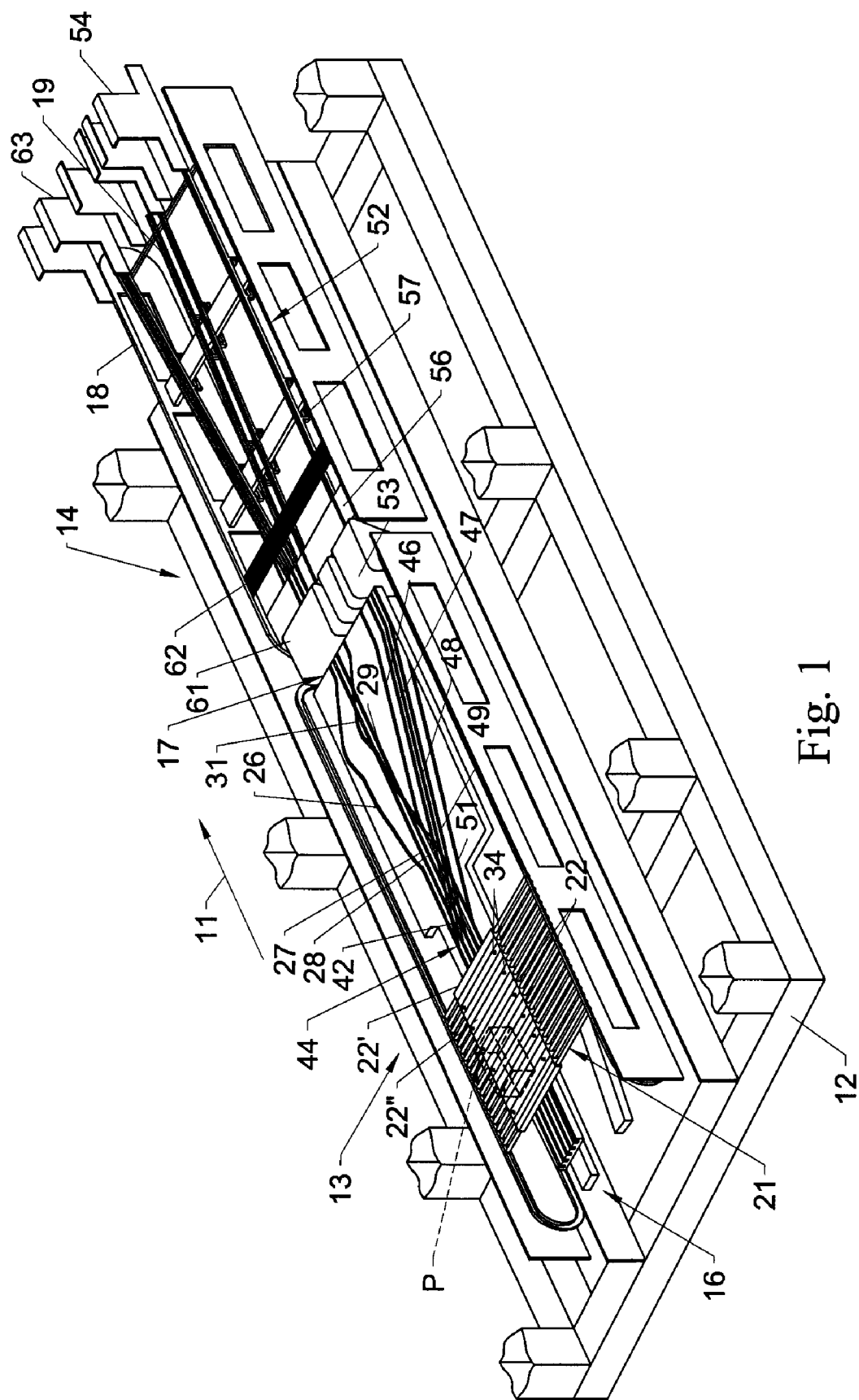
FIG. 1 is a perspective view generally illustrating the turner/divider unit of the present invention.
Figure 2:
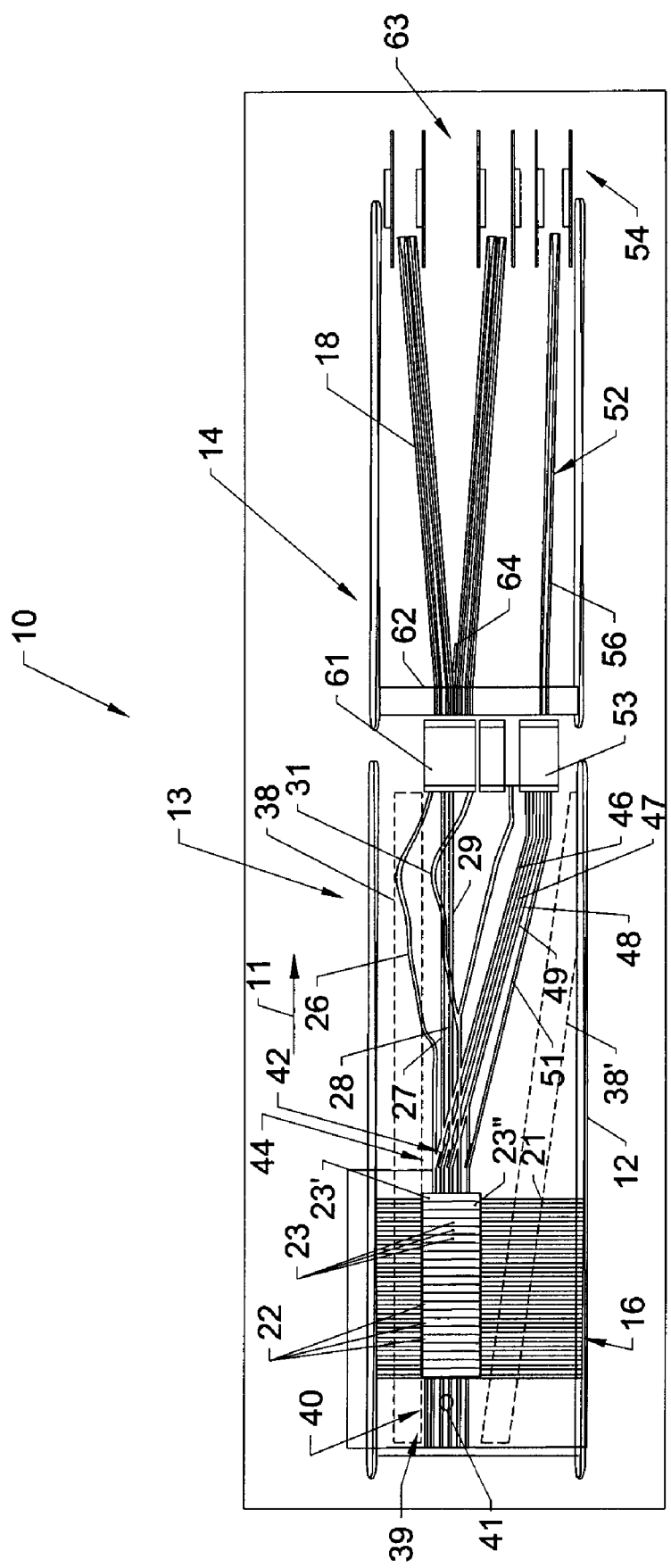
FIG. 2 is a plan view illustrating the turner/divider unit or system of claim 1 and further illustrating the guide tracks and reject tracks or lanes.

Referring now to the drawings in which like numerals indicate like parts throughout the several views, FIGS. 1 and 2 generally illustrate the turner/divider system or unit 10 according to the principles of the present invention. The turner/divider system 10 generally is mounted or positioned downstream from a product packaging machine (not shown) for receiving a series of product packages P, each containing a series of products or articles A therein. In the present embodiment illustrated in FIGS. 1-3B, the product packages are shown as 10 or 12 pack containers for beverage containers such as cans, bottles, etc. It will, however, be understood by those skilled in the art that the present invention can be used for turning and dividing product packages of varying sizes and configurations or shapes for use with a variety of products or articles including six, eight, ten, or twelve packs of bottles or cans, or larger packages, and packages containing a variety of other, different type or shaped articles such as boxes, pouches, etc. As further illustrated in FIGS. 1-3B, the product packages P typically are received from the packaging machine in a substantially longitudinally extending alignment or orientation and are conveyed along a path of travel indicated by arrows 11, through the turner/divider system 10 for rotation of the product packages P by approximately 90° or other orientation as needed or desired, and thereafter for separation of the product packages into varying lanes or lines for downstream processing such as loading into cartons.

As illustrated in FIGS. 1 and 2, the turner/divider system 10 generally includes an elongated support frame 12 and typically includes an upstream turning section 13 and a downstream dividing section 14. The turning section 13 generally is positioned at the upstream end 16 of the frame 12 for receiving the product packages P from the packaging machine or line, with the product packages thereafter being turned or rotated approximately 90° or other angles of rotation as needed or desired, as the product packages are moved along the turning section to a downstream end 17 thereof. Thereafter, the product packages are transferred from the turning section 13 to the dividing section 14 whereupon the product packages are divided into a series of product lanes extending along groups of guide tracks 18, 19. Although only two product lanes are illustrated, the product packages can be directed into additional lanes or straight through as needed or desired.

Figure 3A:
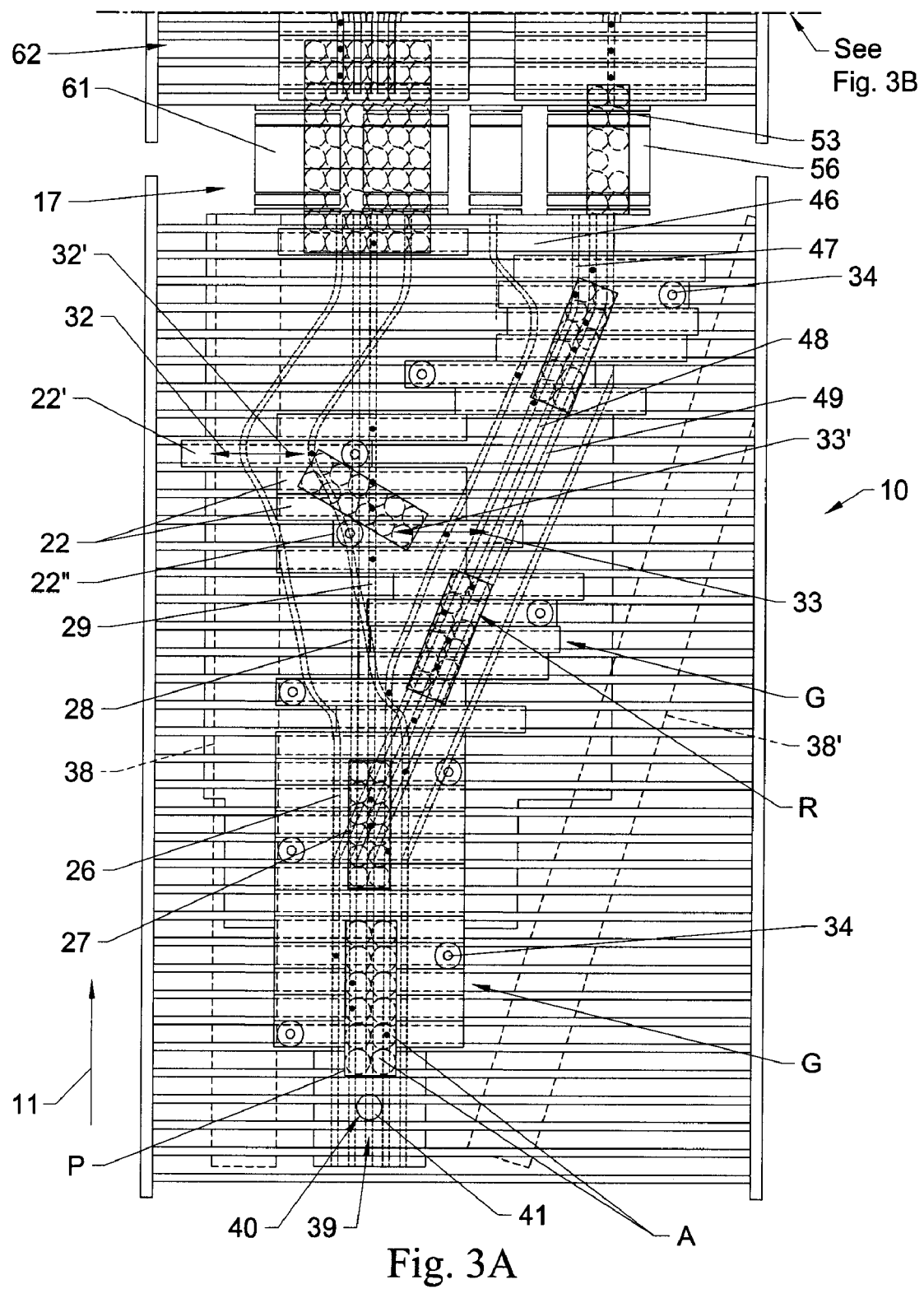
FIGS. 3A-3B are top plan views schematically illustrating the reject and turning, as well as the dividing of the turned packages according to the principles of the claimed invention.

As generally illustrated in FIGS. 2 and 3A, the turning section 13 includes a turning conveyor 21 extending along the path of travel 11 of the product packages P. The turning conveyor generally includes a series of slats or similar conveyor supports 22, typically formed from a non-stick, non-skid plastic or other material as known in the art. The slats generally are arranged in groups or sets G, typically of 1-4 or more slats, on which the product packages P are received and supported for turning or rotation along the turning section. Each of the slats further generally includes one or more guide pins 23 (FIG. 3A) mounted to an underside surface thereof. The guide pins mounted to each of the slats can be of varying lengths, typically with 1-3 differing lengths, or greater numbers of differing lengths of guide pins being provided. The guide pins are mounted at spaced locations across the bottom surface of the slats. For example, each group of slats will comprise of carry slats and a pair of turn slats. The carry slats will have guide pins to direct the package through the turning section or down the reject lane. The turn slats will each have a turning pin on the top side thereof and one or more guide pins on the underside thereof to move the slats laterally across the package path to rotate the packs. The diameter of the turn pins and their mounting position on their slats are approximately one pack width apart to allow effective turning of the packages. On the turner conveyor, each alternate set of carry slats has guide pins mounted in different positions allowing a full pitch in which to actuate the reject switch mechanism.

A series of guide tracks 26, 27, 28, 29, and 31 (FIG. 2) extend along the length of the turning conveyor 21, extending below the slats of the turning conveyor and along the path of travel 11 for the product packages P as illustrated in FIGS. 2 and 3A. Each of the guide tracks is formed at a depth generally corresponding to the length of a guide pin 23 of the slats 22 to guide the slats along their path of travel during a turning operation. For example, as indicated in FIG. 4, guide track 26 is positioned so as to receive and guide the guide pin 23' of the front or foremost slat 23' of each group G of slats 22 along a divergent path laterally away from and toward the path of travel of the product packages as the product packages are moved along the turning conveyor, as indicated by arrows 32 and 32' in FIG. 3A. Similarly, guide pins 23" mounted to the slat 22" of each group G of slats 22 will engage and be guided along guide track 31 along a divergent path toward and away from the path of travel 11 of the product packages P as they move along the turning conveyor, as indicated by arrows 33 and 33'. Turning pins 34 (FIGS. 3A-4) are mounted to the upper surfaces of the slats 22' and 22" of each group G of slats 22, typically along the opposite side edge of such slats from their turning pins. As the slats 22' and 22" of each group G of slats 22 are moved laterally away from the path of travel 11 of the product packages along the turning conveyor, the turning pins 34 attached thereto likewise are pulled laterally across the path of travel of the product packages. As a result, as indicated in FIG. 3A, the turning pins engage and urge the ends of the product packages P laterally, causing the product packages to rotate by approximately 90° into a turned or reoriented position.

It will be understood that the product packages also can be rotated to other, varying alignments or orientations as needed or desired. For example, if the turning pins are removed, the product packages can be conveyed across the turning section without being turned if required. Still further, while the guide tracks used to direct the turning movement/operation of the product packages are shown as the outer guide tracks 26 and 31, it also is possible to reposition the turning tracks adjacent one another, with larger guide pins being used therefor, as needed for improving turning geometry and reducing track cross-over issues.

In addition, matching the lengths of the guide pins with the depth of their associated guide tracks helps to foster a natural alignment of the slats, although there also can be instances where shorter guide pins cross deeper guide tracks. Typically, the slats pass straight across this junction, but upon initial startup or restarting of the turning conveyor should the slats have become displaced, such as during cleaning, etc., channels can be cut to allow re-entry of the slat into the correct track. Thus, if the slats have become laterally displaced, they will tend to automatically be guided into their proper alignment as their guide pins engage and are received in their associated guide tracks. Alternatively, the use of multiple guide pins on different centers can further help realign the slats, and/or one or more reentry tracks, indicated at dashed lines 38 and 38' in FIG. 3A, can extend along a return portion of the turning conveyor to help guide physically displaced slats back to their initial product receiving position.

As indicated in FIGS. 2-3A, the turner/divider unit 10 includes a reject system 39 that comprises an inspection assembly or system 40 that generally is mounted at an upstream location along the turning conveyor 21 in a position in advance of the start of a turning operation by the turning conveyor. The inspection system 40 typically includes a conventional video monitoring system having a sensor 41, such as a video camera or similar monitoring device or detector that is mounted in a position to monitor the incoming product packages P. The sensor 41 detects whether the product package passing thereunder is defective (i.e., its ends are not properly glued, closed, etc.). In response to detecting a defective product package "R" a switching mechanism 42 (FIGS. 2 and 4) will be actuated. The switching mechanism 42 typically is engaged or cycled only when a rejected or defective package is detected, to reduce maintenance and increase the operative life thereof, and includes one or more gates 43 (FIG. 4) mounted along the guide tracks 26-31 at the junction point 44 or break in the guide tracks.

In the illustrated embodiment, three gates are shown, one for each set of carry slats and a third to redirect the turning pin on the reject side. However, fewer or more gates also can be used as will be understood by those skilled in the art. The gates 43 (FIG. 4) typically are raised vertically, such as by solenoids, motors, cylinders or other drive units (not shown) into a blocking position so as to prevent further forward movement of the guide pins of the group of slats on which the rejected product package is supported along their guide tracks 26-31. Instead, the guide pins, and thus the slats, are redirected along a series of reject tracks 46-51, as indicated in FIGS. 3A-3B, prior to the rejected product package being turned by the turning section.

The rejected product packages R are directed along the reject tracks 46-61 toward a reject lane 52 that extends from a transfer belt 53 adjacent the downstream end 17 of the turning section 13 along a side edge of the dividing section 14 of the turner/divider system 10 to a discharge area 54, as indicated in FIG. 2. The transfer belt 53 generally is mounted adjacent the distal end of the reject lanes for the turning conveyor, positioned such that the turning pins 34 of the slats can pass by the side edges thereof as the slats are pivoted downwardly along the return stroke of the turning conveyor and the rejected product packages R are deposited on the transfer belt. The rejected product packages are then passed over a guide track block 56 before the pins enter the divider guide tracks and the product packages are picked up by a conveyor 57, which transports the rejected product packages R along the reject lane 52 toward the discharge area 54. Alternatively, the bed of the dividing section conveyor 62 can be made narrower and the reject lane 52 can be a separate conveyor or roller bed running outboard and alongside the dividing section conveyor 62.

Figure 3B:
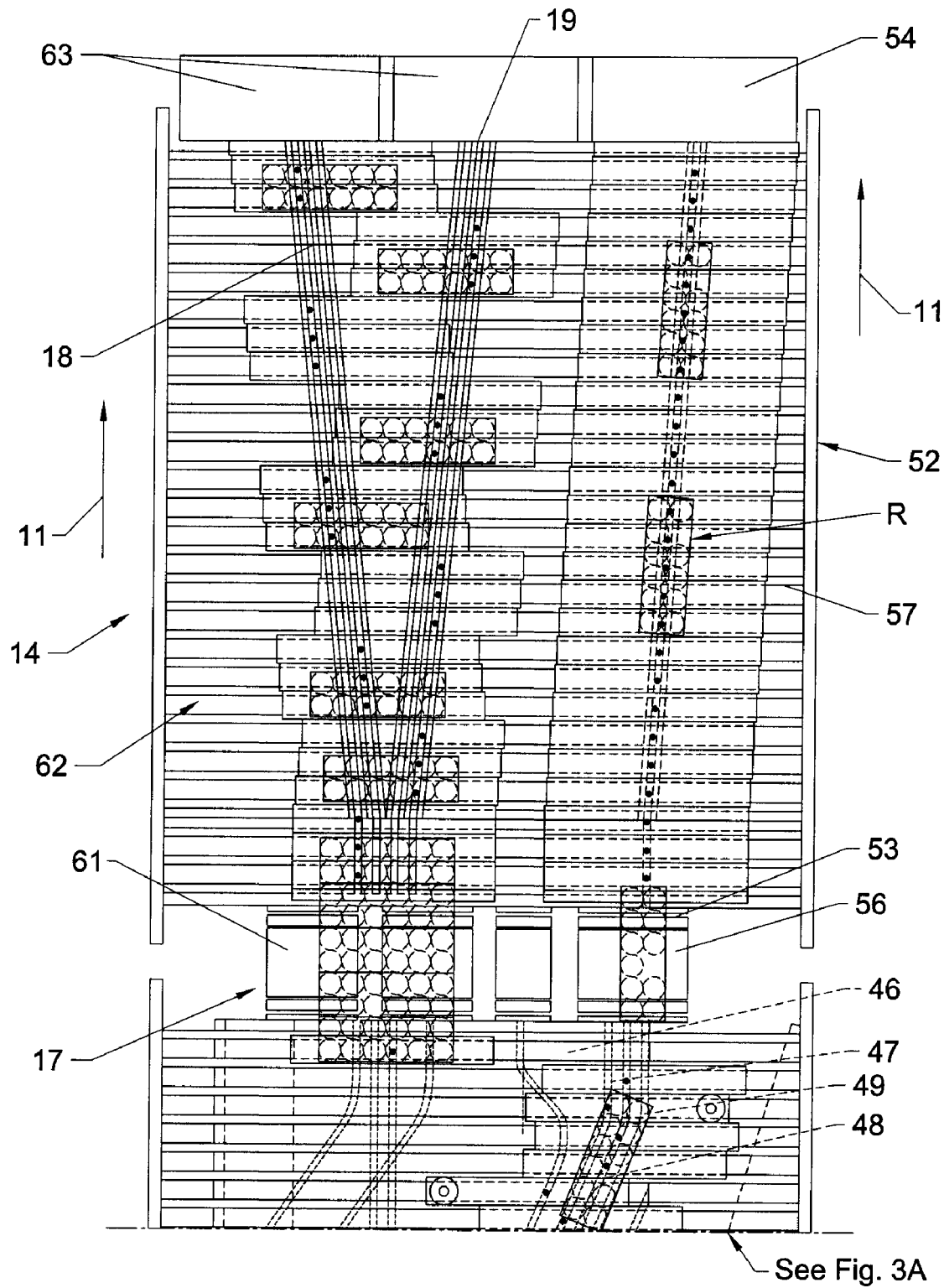
Figure 4:
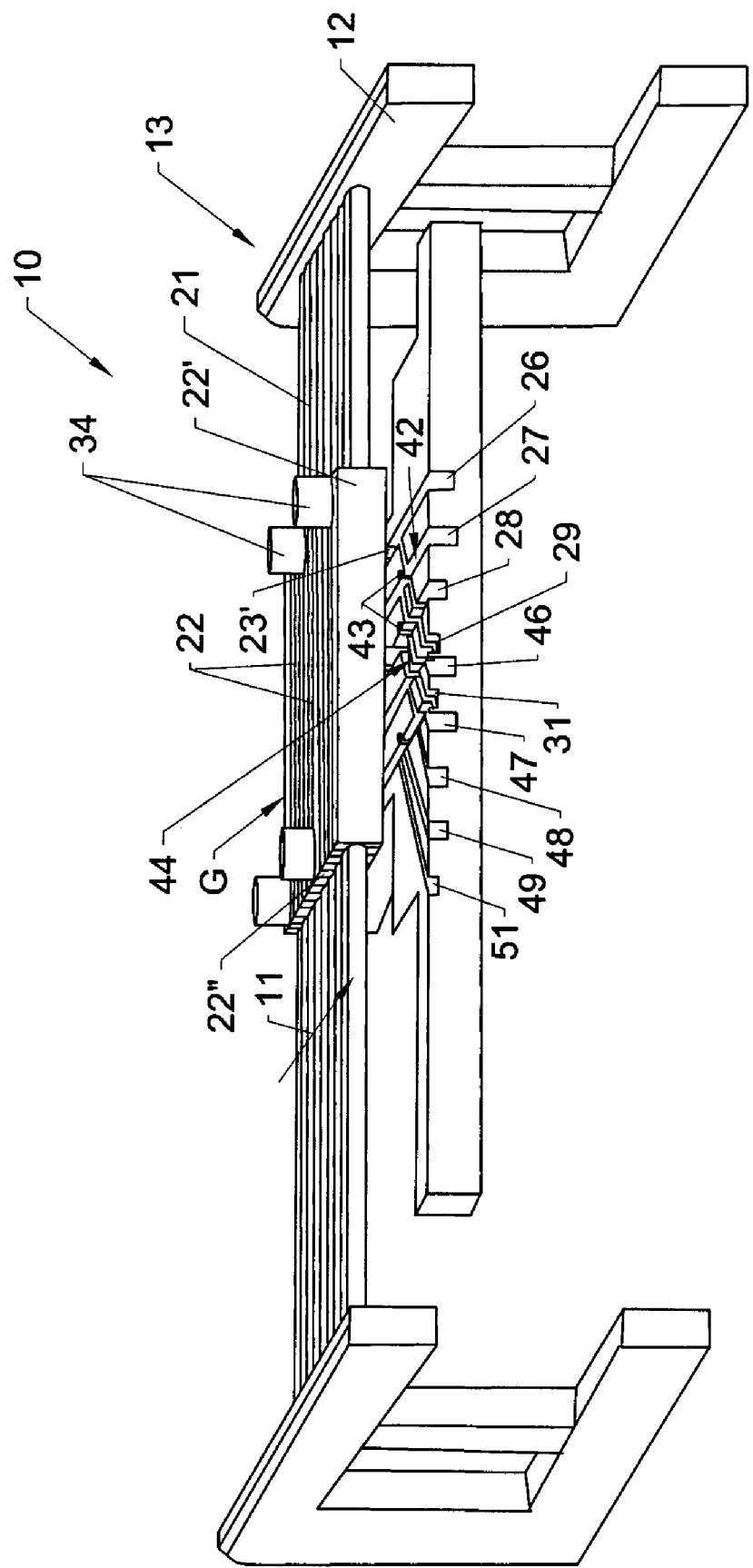
FIG. 4 is a perspective, cross sectional view of the turning section conveyor and guide tracks.

As indicated in FIGS. 2 and 3B, once the product packages have been turned or rotated approximately 90° as they are moved along their path of travel along a turning section, the turner slats of each group of slats typically are guided firstly beyond the center of the package to ensure the pack is fully turned 90 degrees, and then are urged inwardly, back toward a centrally aligned position at the distal end of the turning conveyor to allow the turning pins to pass between the transfer belts 61. At the end 17 of the turning section, the product packages are handed off or discharged by the turning conveyor 21 onto the transfer belt 61. The transfer belts 61, similar to transfer belt 53, are positioned so that as the slats of the turning conveyor are rotated downwardly toward their downward or turned stroke therefore, the turning pins 34 attached to the upper surfaces of the turner slats 22' and 22" (FIG. 3A) of each group G of slats 22 will pass inbetween without interference or engagement with the transfer belt.

As indicated in FIGS. 1 and 3A, the product packages P are passed from the transfer belt 61 to the dividing section conveyor 62, which continues to move the product packages forwardly along their path of travel 11. The dividing section conveyor typically will include a series of diverging lanes 18 and 19, along which the product packages P are separated or divided. It will be understood by those skilled in the art that while two lanes are illustrated, it also is possible to use a greater number of lanes or simply use one lane for transport of the rotated or turned product packages to a downstream discharge area 63 (FIG. 2). The groups of slats on the divider conveyor have guide pins mounted in different locations to allow each group of slats to be guided down a particular guide track. In the present invention the guide pin can be in one of four locations each dedicated to travel down guide tracks 18,18' 19 or 19'. The guide tracks further can be pivotable about their upstream ends to enable the position of the discharge end of each guide track to be adjusted to set the divide position. As illustrated in FIG. 1-3, the guide tracks are positioned to divide the package into two lanes. Pivoting all the guide tracks 18,18' 19 or 19' to run parallel would discharge all packages into a single lane while pivoting the two innermost guide tracks together and pivoting the outer guide tracks outwards would result in the packages being discharged in three lanes due to the pattern of the guide pins.

In operation of the turner/divider system 10 of the present invention, as a series of product packages P are received from an upstream product packaging machine or line (not shown), the product packages are initially monitored and inspected by the inspection system 40 at the reject system 39 positioned adjacent the upstream end of the turning conveyor 21 for the turning section 13 of the turner/divider system. Unless a product package is determined to be a defective or rejected product package, each product package is permitted to move forwardly along its path of travel 11 along the turning conveyor 21. After passing junction point 44, the guide pins 23' and 23" mounted along the outer edges of the turner slats 22' and 22" of each group G of slats 22 are directed along an initially outwardly diverging paths laterally across the path of travel 11 of the product packages P, as indicated by arrows 32 and 33 in FIG. 3A. As a result, the turner slats are pulled or urged laterally across the turning section conveyor, moving in the direction of arrows 32 and 33. As the turner slats 22' and 22" move laterally across the turning conveyor, turning pins 34 attached to the opposite side edges thereof, engage and urge the sides of the product packages laterally in the direction of arrows 32 and 33, so as to cause the product packages to rotate or pivot at approximately 90° to their new orientation shown in FIG. 3A. The slats 22' and 22" can then be returned to a centered alignment, moving in the direction of arrows 32' and 33' by the return path of the guide pins 23' and 23" along guide tracks 26 and 31.

Thereafter, the turned or reoriented product packages are transferred to the dividing section conveyor 62 for the dividing section 14. As the turned or reoriented packages are moved along the dividing section, they are further split or divided into multiple product lanes along tracks 18 and 19 and are conveyed to a discharge area 63 for collection for storage and transport or further processing as needed.

Alternatively, if a defective or rejected product package R is detected by the sensor 41 entering the turning section of the turner/divider system of the present invention, the inspection system 40 will cause the gates 43 (FIG. 4) of the switch mechanism 42 to be engaged and moved into their blocking position projecting across the guide tracks 26-31. For example, after the inspection system identifies a defective pack, the control system actuates the switching mechanism so that the gate is actuated in the pitch preceding the defective pack. As the guide pins 23, 23' of the slats of the groups of slats carrying the rejected product package thereon engage the gates, they are directed diagonally along a reject tracks 46-51 away from the path of travel 11 of the product packages P and toward a reject lane 52 (FIG. 3B). The rejected product packages R thereafter are transferred to the reject lane 52, which conveys the product packages along a path adjacent the lanes of the dividing section toward a separate discharge point or area 54 for collection of the products to be returned for repackaging as needed.

By positioning the rejected system along an upstream portion of the turning section, the present invention enables rejected packages to be removed from the turning and dividing sections of the turner/divider system prior to the product packages being turned, and allows for enhanced production rates as the rejected product packages can be removed from the flow of product packages moving along the turner/divider system prior to their reaching a turning and/or dividing point, without requiring expanded or increased area for the turner/divider unit. The present system also can be incorporated into existing packaging lines, with the turner/divider unit being close coupled to and driven by an upstream parent packaging machine.

It will be further understood by those skilled in the art that while the present invention has been described above with reference to preferred embodiments, numerous variations, modifications, and additions can be made thereto without departing from the spirit and scope of the present invention as set forth in the following claims.

What is claimed:

1. A system for turning and separating a series of product packages moving along a packaging line, comprising:
   a turning section comprising:
      a conveyor having a series of slats moving along a path of travel, said slats each including a guide pin mounted thereto;
      a series of guide tracks extending from an upstream position to a downstream position and adapted to receive and guide said guide pins of said slats therealong, at least one of said guide tracks extending along a divergent path for directing selected ones of said slats laterally across their path of travel to cause turning of a product package thereon;
      a reject system positioned along said conveyor of said turning section of said turning section for monitoring the product packages and rejecting defective product packages, said reject system including a reject lane, and a switch mechanism moveable into a position along the path of travel so as to cause a rejected package to be diverted to said reject lane prior to turning of the product package, in response to detection of the rejected package; and
      a dividing section downstream from said turning section and including a series of diverging lanes along which the product packages are separated.

2. The system of claim 1 and wherein said reject system comprises an inspection system including a detector mounted adjacent said conveyor in a position for monitoring the product package moving along said inlet to detect rejected packages.

3. The system of claim 1 and wherein said switch mechanism comprises at least one gate moveable into a blocking position along one of said guide tracks, and an actuator for moving said gate into its blocking position.

4. The system of claim 3 and wherein said actuator comprises a solenoid, a cylinder, or motor for moving said gate between its blocking position and a non-engaging position.

5. The system of claim 3 and wherein said reject system further comprises an inspection system including a detector mounted in a position for monitoring the product packages as they move along said conveyor of said turning section to detect rejected product packages.

6. The system of claim 1 and wherein selected ones of said slats of said conveyor of said turning section comprise turning pins mounted therealong.

7. The system of claim 1 and further comprising a series of reject tracks extending across said guide tracks from said conveyor of said turning section to said reject lane for guiding a series of slats having a rejected package thereon toward said reject lane.

8. The system of claim 7 and wherein said reject tracks cross said guide tracks at a series of junction openings to enable said guide pins of said slats to pass therethrough.

9. The system of claim 1 and wherein each slat includes one or more guide pins on multiple centers for engaging multiple ones of said guide tracks.

10. The system of claim 1 and further comprising a reentry track extending along a return portion of said conveyor of said turning section for realigning displaced ones of said slats.

11. The method of claim 10 and further comprising dividing the non-rejected product packages into a plurality of lanes after the non-rejected product packages have been turned.

12. The method of claim 10 and wherein diverting the groups of slats with the defective package thereon comprises moving a gate into a blocking position across at least one of the guide tracks so as to direct a guide pin of at least one of the slats of the groups of slats carrying the defective package along a reject track.

13. The method of claim 11 and wherein monitoring the product packages comprises providing a detector along the turning conveyor in a position to observe the product packages and detect a defective package moving along the turning conveyor prior to turning the defective package.

14. The method of claim 10 and further comprising transferring the turned product packages from the turning station conveyor to a dividing conveyor and thereafter dividing the non-rejected product packages between a series of lanes.

15. The method of claim 10 and wherein turning the product packages comprises moving a guide pin of at least one of the slats of each group of slats carrying non-rejected packages thereon along a divergent path with respect to the path of travel of the turning conveyor, engaging a portion of the non-rejected packages thereon with a turning pin, and urging the non-rejected packages laterally across the path of travel of the turning conveyor.

16. The method of claim 10 and further comprising transferring the turned product packages to a series of slats moving along a dividing conveyor, moving a switching mechanism into a position to be engaged by a guide pin of at least one of the slats, and separating and directing the turned product packages down a series of divided lanes.

17. A system for turning and separating a series of product packages moving along a packaging line, comprising:
   a turning section comprising:
      a conveyor having a series of slats moving along a path of travel, said slats each including a guide pin mounted thereto;
      a series of guide tracks extending from an upstream position to a downstream position and adapted to receive and guide said guide pins of said slats therealong, at least one of said guide tracks extending along a divergent path for directing selected ones of said slats laterally across their path of travel to cause turning of a product package thereon; and wherein said guide tracks are formed with differing depths;
      a reject system positioned along said conveyor of said turning section of said turning section for monitoring the product packages and rejecting defective product packages, said reject system including a reject lane, and a switch mechanism moveable into a position alone the oath of travel so as to cause a rejected package to be diverted to said reject lane prior to turning of the product package, in response to detection of the rejected package; and a dividing section downstream from said turning section, comprising a divider conveyor having multiple sets of slats thereon to enable said reject lane to pass along the divider conveyor; and including a series of diverging lanes along which the product packages are separated.

18. The system of claim 17 and wherein said guide pins are formed with varying lengths corresponding to said differing depths of said guide tracks.

19. A system for turning and separating a series of product packages moving along a packaging line, comprising:

a turning section comprising:

a conveyor having a series of slats moving along a path of travel, said slats each including a guide pin mounted thereto;

a series of guide tracks extending from an upstream position to a downstream position and adapted to receive and guide said guide pins of said slats therealong, at least one of said guide tracks extending along a divergent path for directing selected ones of said slats laterally across their path of travel to cause turning of a product package thereon;

a reject system positioned along said conveyor of said turning section of said turning section for monitoring the product packages and rejecting defective product packages, said reject system including a reject lane, and a switch mechanism moveable into a position along the oath of travel so as to cause a rejected package to be diverted to said reject lane prior to turning of the product package, in response to detection of the rejected package: and a dividing section downstream from said turning section, said dividing section comprising a divider conveyor having multiple sets of slats thereon to enable said reject lane to pass along the divider conveyor; and including a series of diverging lanes along which the product packages are separated.

20. A method of turning and dividing a series of product packages, comprising:

receiving the product packages on groups of slats moving along a turning conveyor of a turner/divider system;

engaging a series of guide tracks with guide pins mounted to the slats as the product packages are moved along the turning conveyor;

monitoring the product packages moving along the turning conveyor to detect a defective package;

if a defective package is detected, diverting a group of slats bearing the defective package thereon toward a reject lane and away from non-rejected packages; and continuing to move the non-rejected packages downstream along the turning conveyor and thereafter turning the non-rejected packages approximately 90° to reorient the non-rejected packages.

* * * * *